United States Patent [19]

Sanderson

[11] Patent Number: 5,534,156
[45] Date of Patent: Jul. 9, 1996

[54] REGULATION OF *ESCHERICHIA COLI* AND OTHER MICROORGANISMS THROUGH MAGNETIC WATER TREATMENT

[75] Inventor: Charles H. Sanderson, Fort Wayne, Ind.

[73] Assignee: Magnatech Corporation, Fort Wayne, Ind.

[21] Appl. No.: 345,137

[22] Filed: Nov. 28, 1994

Related U.S. Application Data

[63] Continuation-in-part of Ser. No. 197,928, Feb. 17, 1994, Pat. No. 5,368,748.

[51] Int. Cl.$^6$ ..................................................... C02F 1/48
[52] U.S. Cl. ............................ 210/695; 210/748; 422/22
[58] Field of Search ..................................... 210/748, 222, 210/764, 695; 422/22

[56] References Cited

U.S. PATENT DOCUMENTS 4,065,386  12/1977  Rigby .
5,034,138   7/1991  Hatanaka et al. ...................... 210/749
5,055,188  10/1991  Johnston et al. ....................... 210/222
5,200,071   4/1993  Spiegel .................................... 210/222
5,227,683   7/1993  Clair ........................................ 210/222

*Primary Examiner*—Neil McCarthy
*Attorney, Agent, or Firm*—Randall J. Knath

[57] ABSTRACT

A method and apparatus in which water is magnetically treated to kill microorganisms such as bacteria colonies in water systems, thereby reducing the requirements and cost of watersystem maintenance and the quantity of toxic chemical treatments released to the environment. The method includes removing a volume of water from a bacterially or microorganism contaminated environment, magnetically treating the water, then returning the treated water back to the environment. The apparatus includes a permanent magnet of alternating polarity to form a magnetic field through which the water is treated and passed.

7 Claims, 4 Drawing Sheets

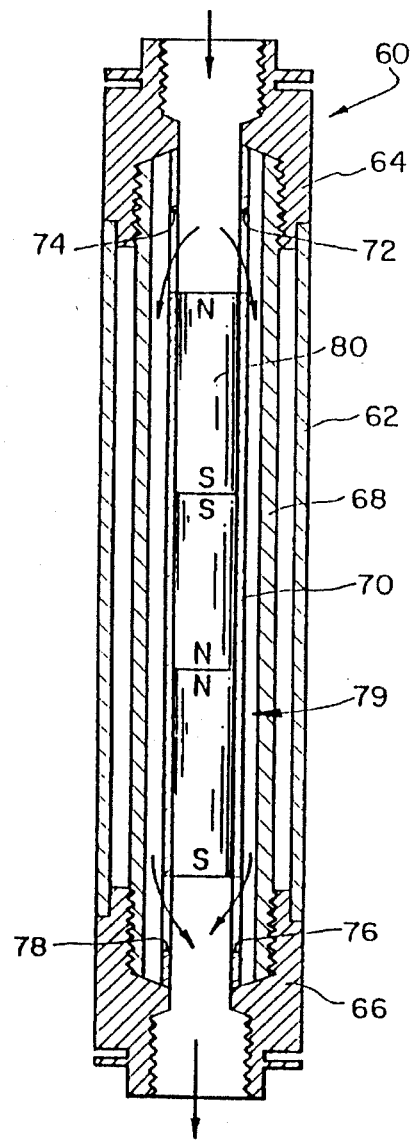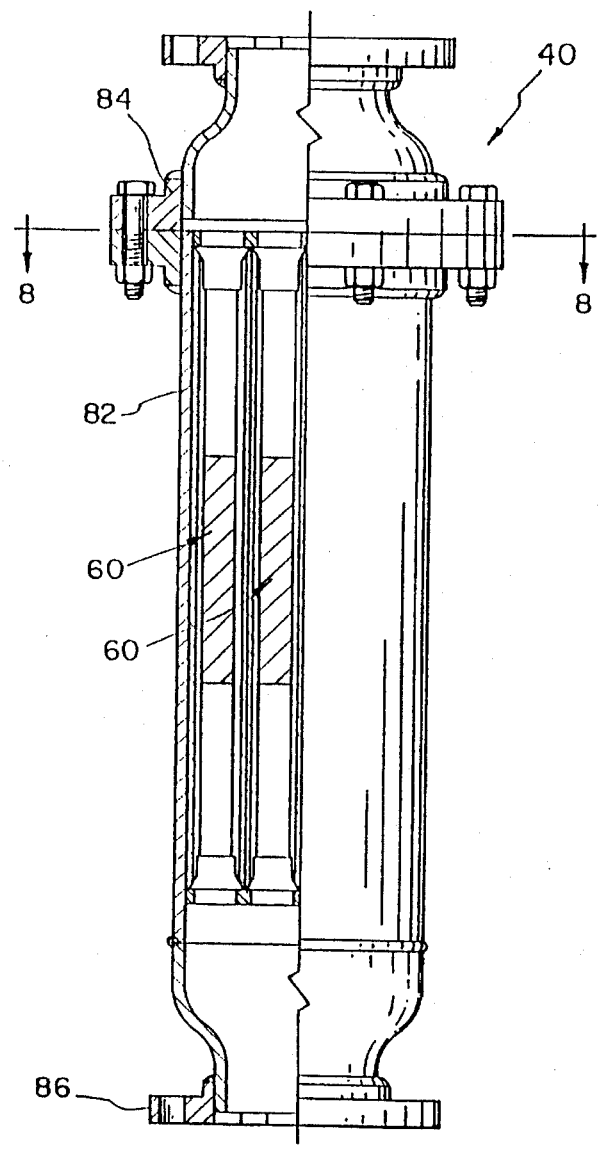
FIG. 3
FIG. 5

REGULATION OF *ESCHERICHIA COLI* AND OTHER MICROORGANISMS THROUGH MAGNETIC WATER TREATMENT

RELATED APPLICATIONS

This case is a continuation-in-part of Ser. No. 197,928 U.S. Pat. No. 5,368,748 filed Feb. 17, 1994.

BACKGROUND OF THE INVENTION

The present invention generally relates to a method and apparatus for reducing the growth and killing bacteria and particularly *Escherichia coli* found in water.

Human beings or other animals infected with or carriers of disease may discharge pathogenic organisms into wastewater. Such organisms present in wastewater include: bacteria such as *Escherichia coli, Legionella pneumophila,* and Salmonella; viruses, such as Hepatitis A, Enteroviruses, and Adenoviruses; protozoa, such as *Entamoeba Histolytica, Giardia lamblia* and others. Bacterial pathogenic organisms excreted by human beings typically cause diseases of the gastrointestinal track such as cholera, dysentery, typhoid fever and diarrhea because these organisms are highly infectious, they are responsible for many thousands of deaths each year in areas of poor sanitation.

A current treatment is that of chemical killing agents such as chlorine, ozone, and other oxidizing chemicals added to waste water. Chlorine has been used for years to kill water borne bacteria. A major advantage offered by chemical treatments is that they can be engineered to protect the water and inhibit bacteria growth after leaving the treatment system.

A number of problems have persisted with the previous chemical treatment methods. The most common chemicals, chlorine and ozone, have a disadvantage in that they are toxic materials to most lifeforms. Various government agencies are looking at new discharge limits to reduce or eliminate the release of these chemicals into the water supply and environment. Further, these toxic chemicals may kill off beneficial animals. Additionally, treatment costs are not constant because various uncontrollable environmental factors affect the toxicity of the chemicals, particularly water temperature, pH, dilution and organic or inorganic compounds present in the source of water, such as the reducing agents, $S^{2-}$ $FE^{2+}$, $MN^{2+}$ and $NO^{2-}$.

The present invention is directed to overcoming the aforementioned problems associated with prior methods of bacteria control in water.

SUMMARY OF THE INVENTION

The present invention overcomes the problems and disadvantages of the prior art by providing an apparatus and method for killing bacteria and such as *Escherichia coli*, and others by treating their habitat with water that has been passed through a magnetic field. In accordance with the apparatus and method of the present invention, bacteria counts in water may be reduced in structures such as water pipes, industrial and domestic water handling facilities such as power plants, utilities and municipal and private drinking water stations.

Generally, the invention provides a method and apparatus to kill bacteria by providing a first volume of water containing bacteria and treating a portion of the volume of water by passing it through a magnetic field. The magnetically treated portion is then mixed back into the first volume of water where the bacteria is killed. The greater the flux or density the magnetic field the water is passed through, along with a greater ratio of treated water to untreated water, the greater the effectiveness of treatment.

Types of treatments to which water having bacterial or other infestations may be categorized are batch treatments or injection treatments. Batch treatment (or sometimes called a feedback treatment) takes a portion of the water out of the contaminated environment, treats it magnetically through the magnetic water treatment unit, and replaces it back into the host environment. Examples of this type of treatment may be a water tank to which a pump and magnetic water unit are connected in series. Other types of batch treatments may be utilized is other feedback loop water using industrial and domestic systems. An injection treatment occurs in the system when a separate source of water is treated and injected into the bacteria infested water. Examples of this may include industrial water intakes from or output to a raw water source such as a lake or stream, utility cooling towers. Injection treatment may be utilized to treat both the inside of a water intake pipe and alternatively treat the volume of water flowing out of a water discharge pipe.

An advantage of the magnetic water treatment of the present invention is that it kills bacteria without adding chemicals to the water. The effectiveness of the magnetically treated water is time dependent, the effectiveness decreasing with time. No pollution or permanent change to the water supply is created since the water reverts to its original state and condition after an amount of time.

A further advantage of the magnetic water treatment of the present invention is that the effect on bacterial colonies is measurable within a few minutes of treatment.

The invention, in one form thereof, provides a method for treating water to kill microorganisms within the water. A volume of water containing microorganisms is provided, with at least a portion of the water treated by passing it through a magnetic field. The treated portion is then mixed back into the original volume of water, whereby the microorganisms die. The treatment may include passing the portion of water through a plurality of magnetic fields having alternating polarity.

In another form of the invention, an apparatus is provided for killing bacteria, particularly *Escherichia coli*, in water within a containment zone. The apparatus includes a water conduit having an inlet and outlet in communication with the containment zone. A pump is connected to the water conduit for pumping water from the containment zone through the water conduit and back to the zone. A water treatment unit is disposed in the water conduit including a magnet for creating a magnetic field through which water in the water line is subjected, so magnetically treated water may enter the containment zone and kill bacteria colonies in contact with the water. The magnetic water treatment unit may comprise a plurality of permanent magnets having a sleeve means for shielding each permanent magnet from the others. This shielding sleeve collects the lines of magnetic force produced by the magnet to maximize the magnetic lines of force that perpendicularly intersect the direction of water flow through the water line.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a longitudinal section view of a magnetic treatment unit utilized in one form of the present invention;

FIG. 5 is a partial sectional view of one form of the magnetic treatment unit of the present invention utilizing a plurality of magnetic units.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Since the numbers of pathogenic organisms found in wastes and polluted waters are small in number and difficult to isolate and identify, the coliform organism, which is more numerous and more easily tested for, is commonly used as an indicator organism.

The gastrointestinal track of human beings contains a large supply of such coliform bacteria. Each person discharges from 100 to 400 billion coliform organisms per day (for the most part *Escherichia coli*), in addition to other bacteria. Hence, the presence of coliform bacteria is taken as an indication that pathogenic organisms may also be present, and the absence of coliform organisms is taken as an indication that the water is free from disease producing organisms.

Figure 1:
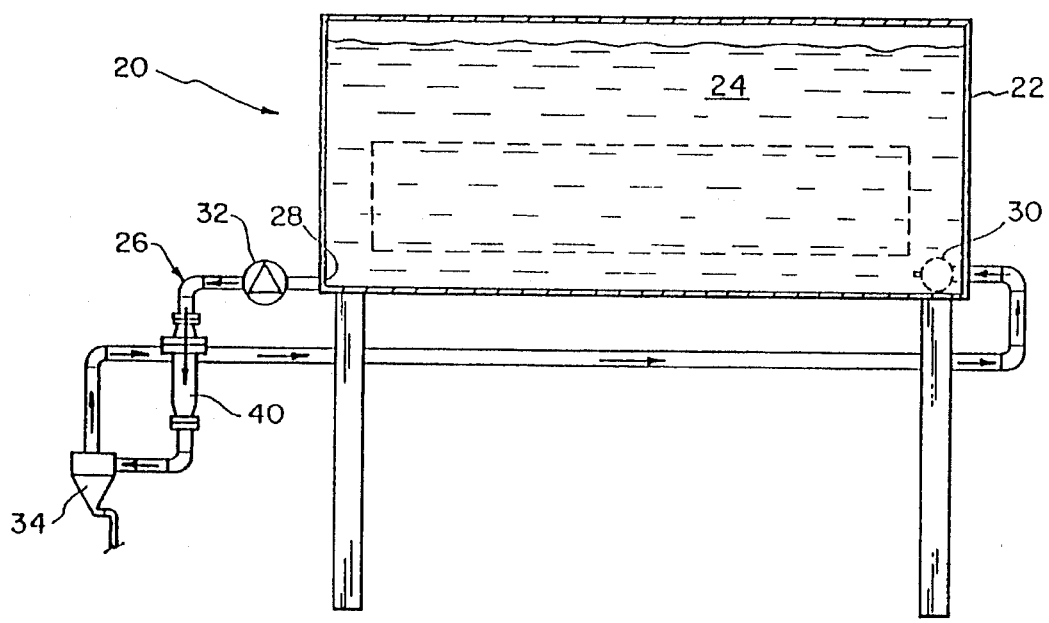
FIG. 1 is an elevational view of one embodiment of the present invention.

An embodiment of the invention to kill and reduce population of microorganisms such as *Escherichia coli* and others is shown in FIG. 1. There is shown a generic batch treatment unit 20 having a tank 22 filled with a volume of water 24 in which initially, microorganisms such as *Escherichia coli* are present and living. Unit 20 includes a water line 26 having both an inlet 28 and an outlet 30. A water pump 32 is disposed in water line 26 for pumping water from water inlet 28 through pipe 26 and out water outlet 30. As shown in FIG. 1, a magnetic water treatment unit 40 is disposed within water line 26 for magnetically treating water flowing through water line 26. Downstream from water stream unit 40 is located a hydrocyclone 34 for removing entrained sludge or other insoluble particles within water line 26. For proper operation of the invention, a hydrocyclone is not required but may increase the effectiveness of the treatment. The particulars of the magnetic water treatment unit 40 will be discussed below.

Figure 2:
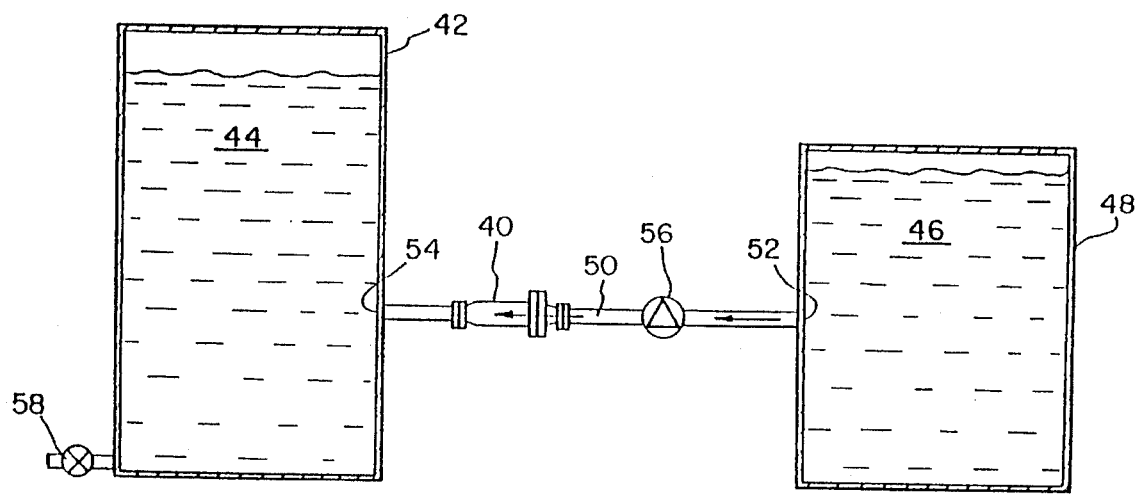
FIG. 2 is an elevational view of another embodiment of the present invention.

FIG. 2 is another embodiment showing use of injection treatment, killing microorganisms such as *Escherichia coli* or *Legionella pneumophila* in a volume of water. As shown in FIG. 2, a containment tank 42 includes a volume of microorganism infested water 44. In regards to the injection treatment, a second supply of water 46, as shown in tank 48, is connected by a water line 50 to tank 42. Water line 50 includes an inlet 52 communicating with tank 48 and an outlet 54 in communication with tank 42. Pump 56 is disposed within water line 50 to control the flow of water 46 into tank 42. A magnetic water treatment unit 40 is disposed downstream of pump 56 within water line 50 so that water 46 pumped from tank 48 will be magnetically treated and injected into water 44 within tank 42. Tank 42 further includes a drain valve 58 to remove organisms and other settled debris within tank 42. Although the previous two embodiments show the magnetic treatment unit 40 downstream from pumps 32 and 56, alternatively, units 40 may be disposed upstream.

Both FIGS. 1 and 2 show tank style embodiments in which volumes of water have been infested with microorganisms. The present method and apparatus operate without regard to the shape of the volume of water treated. Pipes, vessels, boilers, containment and even open water may be equivalently treated with the disclosed method and apparatus.

The key to the water treatment system of the present invention is that of creating a magnetic field through which water may pass. The magnetic water treatment unit 40 as shown in FIG. 3 is similar to the magnetic water treatment units shown in any one of the following U.S. Pat. Nos. hereby incorporated by reference: 3,951,807, 4,050,426, 4,153,559, 4,299,700, 4,320,003, 4,357,237 and 4,430,785.

FIG. 3 discloses a single magnetic core unit 60 useful in low volume magnetic treatment of water. A single core unit includes an outer casing 62 made of non-magnetic material such as copper and fittings 64 and 66 made of non-magnetic materials such as brass. For purposes of the present description, "non-magnetic" means materials having a very low magnetic permeability and virtually no ferromagnetic characteristics, such as copper, brass, PVC, nylon and Delrin, for example. "Magnetic" materials are those exhibiting high magnetic permeability such as iron and steel.

In one embodiment, inner casing 68 is a threaded galvanized ½ inch steel pipe with an inner diameter of approximately 0.633 inches. Casing 68 is made of a ferromagnetic material having a high magnetic permeability such as preferably galvanized iron or steel, although other materials may be used. Inner casing 68 has an outside diameter less than the inside diameter of outer casing 62 and is uniformly spaced therefrom by threaded attachment to fittings 64 and 66.

Positioned within inner casing 68 is a tube 70 of non-magnetic material such as copper, which is open at both ends and has a pair of apertures 72, 74 and 76, 78 therein. Tube 70 within inner casing 68 forms an annular chamber 79. Apertures 72 and 74 are transversely aligned along an axis which is rotated 90° from the axis along which the apertures 76 and 78 are aligned. This causes the water which enters one end of unit 60 to make a 90° turn upon the longitudinal axis before it exits from the opposite end. Tube 70 has an outer diameter, in a preferred embodiment, of approximately 0.500 inches and inner diameter of 0.400 inches.

Magnet 80 is disposed within tube 70 and is preferably approximately 0.375 inches in diameter, 6.0 inches in length and with a pole spacing of approximately 2.0 inches. The elongated permanent magnet 80, preferably having a composition of cobalt, nickel, aluminum, copper and iron, is magnetized along its longitudinal axis to have a plurality of longitudinally spaced apart poles of alternating polarity represented by the symbols "N" and "S". Magnet 80 is substantially homogeneous in composition and in the embodiment illustrated, comprises three magnetic domains extending transversely throughout the magnet, having their magnet moments oppositely aligned such that alternate north and south poles exist along the length of the magnet 80. A magnet such as this may be produced by imposing on a bar of magnetic material two longitudinally displaced static magnetic fields of opposite polarity. The number of poles for a particular magnet depends to a great extent on the size of the device and the gallon per hour capacity desired, so that in the case of a very small capacity device, a magnet having only 3 dipoles may be most efficient. Magnets with a different number of dipoles may also be used. Magnet 80 or the magnetic fields utilized in this application do not include the earth's own magnetic field but only a magnet or magnetic field produced by man.

Magnet 80 may be provided with a pair of resilient plastic end caps which are compressed against tube 70 so as to frictionally retain magnet 80 in place as in known in the art. Alternatively, other ways of attaching magnet 80 in tube 70 may be used, such as epoxy or interference fitting.

Figure 6:
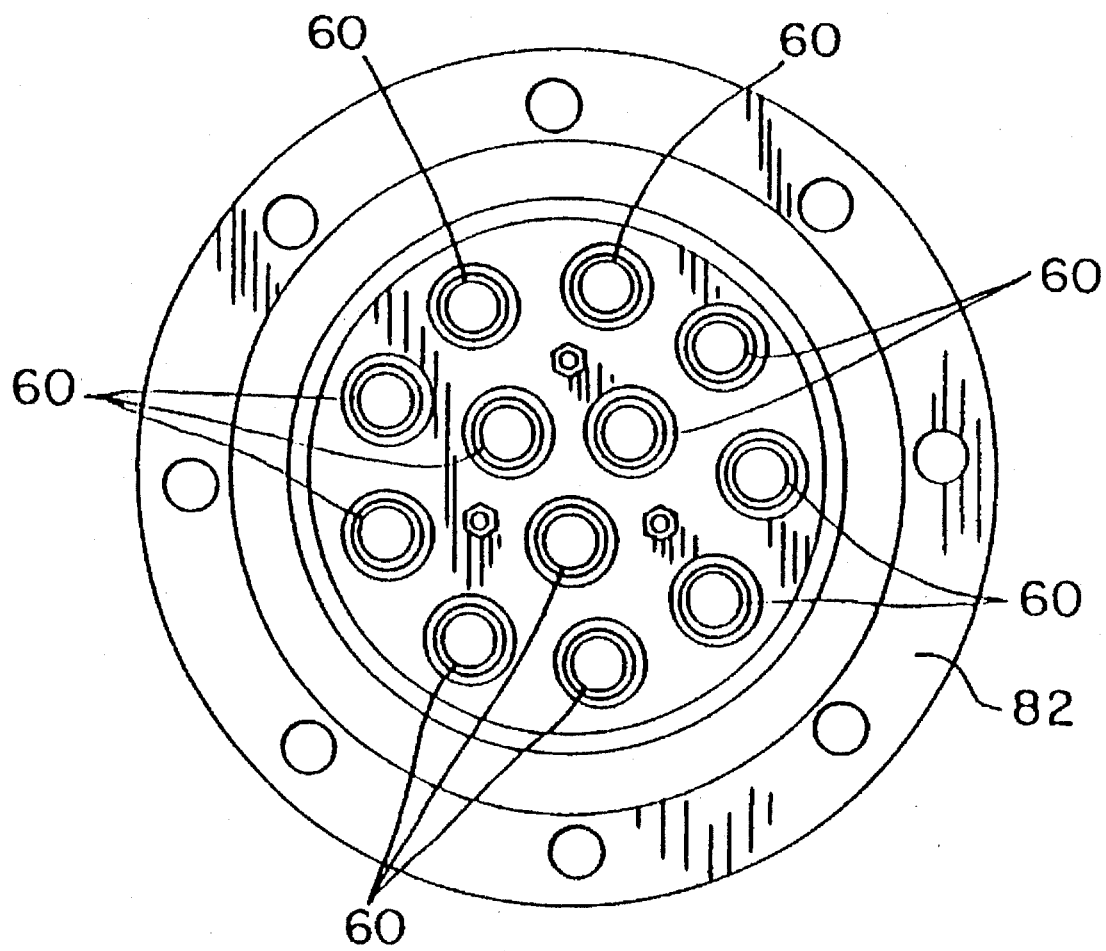
FIG. 6 is a sectional view of the magnetic treatment unit of FIG. 5, taken along line 8—8 and viewed in the direction of the arrows.

The structure of magnetic core unit 60 is designed to concentrate the magnetic field produced by magnet 80 in the annular chamber 79 immediately adjacent thereto, and at the same time, insulate this field from the supporting structure to external ferromagnetic objects which may come in contact with the device. Due to the high permeability of tube 70, the flux produced by magnet 80 will extend radially outward therefrom, pass through tube 70 and return to magnet 80 without straying from chamber 79. Inner casing 68 located about magnet 80 assists in containing the magnetic field. By thus containing the magnetic field, maximum efficiency of subjecting the water flowing through the device to the magnetic field is achieved. Containment of the magnetic field is further enhanced through use of non-magnetic materials for outer casing 62, fitting 64 and 66 (as described in U.S. Pat. No. 4,299,700). Because single magnetic core unit 60 is a low capacity device, a magnetic water treatment unit 40 of the present device, as shown in FIG. 5, includes a plurality of such units 60 to increase the amount of treated water. As shown in FIG. 5, it is possible to arrange a plurality of single magnetic core units 60 together. Although the magnetic water treatment unit 40, shown in FIGS. 5 and 6, includes (12) magnetic core units 60, depending upon the demand for treated water, this number may vary. Unit 40 includes a housing 82 to hold core units 60 parallel to each other. A top flange 84 is bolted to housing 82 and connected to a source of water. A bottom flange 86 is connected to a water return line to the area of water bacteria contamination.

The embodiments in which the present invention may be utilized are quite diverse ranging from water tanks, water intakes, to utility and industrial cooling towers, municipal and private water treatment plants and even open water systems. An embodiment as shown in FIG. 4 discloses a water intake 90, disposed in a lake or river bed 92, utilizing water 94 which may include water having bacteria colonies present.

Figure 4:
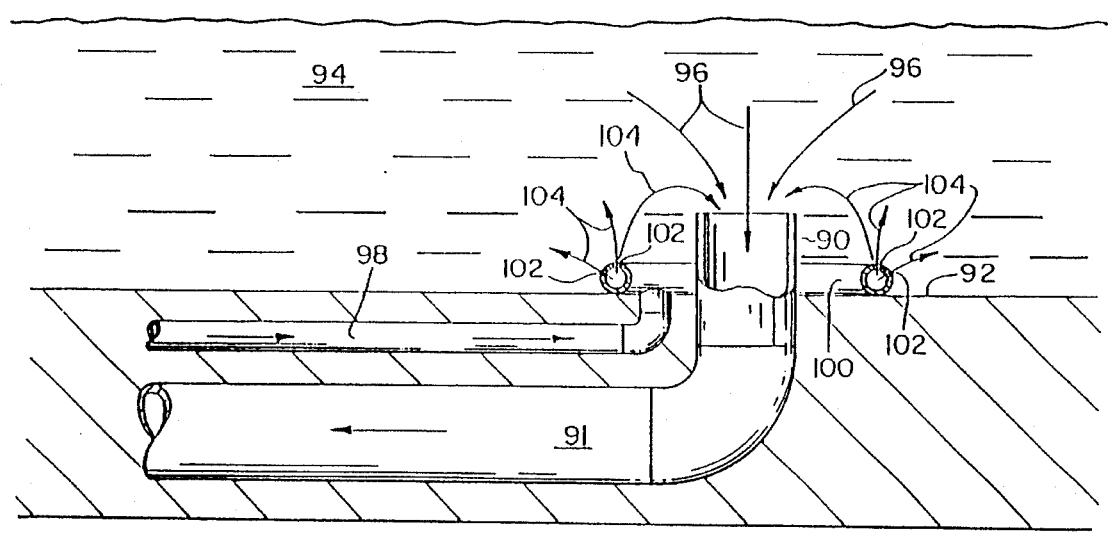
FIG. 4 is a sectional view of one embodiment of the present invention utilized to treat water at a submerged water intake.

As shown in FIG. 4, water intake suctions water 94 through water line 91 to an onshore facility (not shown). Arrows 96 indicate the flow of water 94 into intake 90. For an increased bacteria colony kill, treated water is pumped back to water intake 90 via a treated water line 98. Treated water line 98 contains water treated with a magnetic water treatment unit 40 located in the onshore facility. A collar 100 is disposed about water intake 90 and connected to treated water line 98. Collar 100 includes a plurality of exit ports 102 through which the magnetically treated water flows back around water intake 90. Arrows 104 show the flow of treated water out of collar 100 through exit ports 102 and back around bed 92 and intake 90. Alternatively and equivalently, magnetically treated water may be sprayed directly into the water intake 90 to thereby directly treat all areas downstream within water intake 90. Other variations of injecting the magnetically treated water in the intake may also be utilized.

The invention possibly operates by changing the structure of the water on the macro scale, thereby changing its physical, chemical and biological properties, so that the growth of organisms in contact with this treated water may be altered.

It is known that the growth of all organisms depends upon the essential presence of the proper chemical materials within the growth medium. Thus, eliminating the presence of an essential growth factor will result in the cessation of growth, which, if sustained over a prolonged period of time, usually will result in organism death. This is one possible explanation for the effect of magnetized water on bacteria colonies.

The magnetic treatment of water alters the chemical macrostructure of water. This altered water structure, which is in effect a new solvent, causes chemical equilibria to shift, changing the concentration of existing chemical species and creating a new equilibrium system. It is theorized that chemical species essential for bacteria growth are reduced while other chemical species, some of them toxic to bacteria, are increased.

Test results indicate that bacteria colonies are killed by operation of the present invention. Thus, infection, damage or death due to bacteria colonies found in water supplies are reduced or eliminated.

Although the direct reason why bacteria colonies are killed is unknown, test results have indicated that some activity is taking place to kill microorganism and bacteria colonies, and particularly *Escherichia coli*, exposed to the magnetically treated water of the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for treating water to kill microorganisms, said method comprising:

providing a first volume of water containing microorganisms;

treating at least a portion of said volume of water by passing said portion through a plurality of magnetic fields of alternating polarity formed by a magnet surrounded by a magnetic casing to maximize the magnetic field therein, said volume of water passing through said casing; and mixing said treated portion back into said first volume thereby killing said microorganisms.

2. A method for treating water to kill bacteria, said method comprising:

providing a first volume of water containing bacteria;

treating at least a portion of said volume of water by passing said portion through a plurality of magnetic fields of alternating polarity formed by a magnet disposed in a magnetic casing, said magnet having poles disposed parallel with said volume of water passing thereby, said volume of water passing through said magnetic casing; and mixing said treated portion back into said first volume thereby killing said bacteria.

3. The method of claim 2 in which said mixing said treated water with said first volume is accomplished with a pump.

4. The method of claim 2 in which said first portion of water comprises waste water, said method killing *Escherichia Coli* present in said first portion of water.

5. A method for treating water to kill *Escherichia Coli* bacteria, said method comprising:

providing a first volume of water containing *Escherichia coli* bacteria;

treating at least a portion of said volume of water by passing said portion through a plurality of magnetic fields of alternating polarity formed by a magnet surrounded by a magnetic casing to maximize the magnetic field therein, said volume of water passing through said casing said magnet having poles disposed parallel with said volume of water passing thereby; and mixing said treated portion back into said first volume thereby killing said *Escherichia coli* bacteria.

6. A method for treating a volume of water to kill bacteria within the water, said method comprising:

treating a portion of said volume of water by passing said portion through a plurality of magnetic fields of alternating polarity formed by a magnet surrounded by a magnetic casing, said volume of water passing through said casing; and mixing said treated portion back into said first volume whereby bacteria within the water are killed.

7. The method of claim 6 in which said treatment includes passing said portion through a plurality of magnetic fields having pairs of like poles adjacent each other.

* * * * *